June 17, 1969   J. R. DALE ET AL   3,449,950
APPARATUS FOR WAVE ANALYSIS
Filed March 1, 1967

INVENTORS
JOHN R. DALE
HARRY R. MENZEL
JOSEPH M. McCANDLESS
GARNET GOSS

ATTORNEY

United States Patent Office
3,449,950
Patented June 17, 1969

3,449,950
APPARATUS FOR WAVE ANALYSIS
John R. Dale, Willow Grove, Harry R. Menzel, Hatboro, Joseph M. McCandless, Feasterville, and Garnet Goss, Haverford, Pa., assignors to the United States of America as represented by the Secretary of the Army
Filed Mar. 1, 1967, Ser. No. 620,210
Int. Cl. G01w 1/00
U.S. Cl. 73—170                                                5 Claims

ABSTRACT OF THE DISCLOSURE

A method and apparatus for measuring and recording surface waves in any oceanic area by an oceanographic buoy sensing ambient pressure variations at a prescribed depth below the water surface and transmitting the sensed information to a remote location, and a receiving station receiving and recording the information for spectral analysis of the wave. The oceanographic buoy includes a radio transmitter in a float, a pressure sensor, and a flexible conduit operatively connected therebetween for suspending the sensor at a desired depth below the float. A float is selected having a very high buoyancy to weight ratio, a transmitter selected having a flat response over a range of very low frequencies, and a conduit selected having a very low scope. A minimum length of the conduit required is a function of the maximum wave length of the highest expected sea state, the scope of the buoy, and the measurement error tolerance.

---

The invention described herein may be manufactured and used by or for the Government of the United States of America for governmental purposes without the payment of any royalties thereon or therefor.

BACKGROUND OF INVENTION

Field of invention

The present invention relates to oceanographic measurements and instrumentation, and more particularly to method and apparatus for remotely measuring and recording the surface wave spectra of oceanic areas.

Description of the prior art

More precise and comprehensive spectral analyses of sea waves including the measurement of their height, shape and frequency are often needed for the improvement of equipment subjected to ocean environments. For example, in moored and drifting sonobuoys associated with underwater acoustical surveillance systems, a variety of spurious hydrophone signals are produced and to some degree are caused by surface waves. To improve their performance and reliability requires that they be designed, tested and evaluated with a full understanding of the nature and extent of this cause. A precise time correlation of sonobuoy performance and wave measurements will enable this requirement to be met. One generally known technique for measuring sea waves uses a buoy secured to an embedment anchor or a sea anchor, either anchor being for establishing a relatively fixed elevation reference. Such buoys are relatively expensive and not expendable. Moreover, in the case of tests on sonobuoys of the type which are launched from aircraft, it is desirable that the sea wave measuring means also be air-launched, and the information transmitted therefrom be received and recorded in the aircraft. The use of sea wave measuring devices of the prior art such as those employing anchors are not particularly suited for air-launching and would require major structural changes at considerable expense in order to operate as intended under the additional performance requirements for air-launching.

SUMMARY OF INVENTION

An object of the present invention is to remove all the foregoing disadvantages of the prior art and provide advantages not heretofore obtainable and further to provide novel and improved method and apparatus for measuring and recording sea waves at a remote location. Briefly summarized, this is accomplished in part with a unique oceanographic buoy. The buoy includes a radio transmitter in a float, a pressure sensor, and a flexible conduit operatively connected therebetween for suspending the sensor at a minimum prescribed depth below the float and for transmitting signals according to ambient pressure variations at said depth. It is contemplated that the float have low freeboard variations with wave motion, the transmitter low frequency response, and the conduit low scope. The minimum length of the conduit is critical. The buoy is deployed into the sea area of interest and the pressure variations at the sensor are continuously received and recorded in the aircraft.

BRIEF DESCRIPTION OF DRAWING

In the drawing:
FIG. 1 is a pictorial representation in elevation of an oceanographic buoy according to the invention deployed in a sea area of interest; and
FIG. 2 is a block diagram of a sea wave measuring system incorporating the oceanographic buoy of FIG. 1.

DESCRIPTION OF PREFERRED EMBODIMENT

Referring now to FIG. 1 of the drawing, a body of water such as sea or ocean is illustrated having a stable surface wave W whose profile approximates the shape of a curtate trochoid with crests $b$ and $d$ and troughs $a$, $c$ and $e$. The difference in elevation between the crests and the troughs is defined as the wave height $h$, and the distance between crests is defined as the wavelength $L$. By definition and as used hereinbelow, the dotted line $s$ drawn tangent to the wave troughs 11 represents the so-called undisturbed water surface.

A freely drifting oceanographic buoy indicated generally by the numeral 12 basically includes a float 13 which floats at the wave surface W, an electrical conduit 14 suspended therefrom and a pressure transducer 16 connected at the free end of conduit 14. As shown in FIG. 2, the float 13 houses a modulator 17 connected at its input to transducer 16 and at its output to a transmitter 18, the latter producing an RF output signal to an antenna 19. It is contemplated that the float 13 with all of its contents have a high buoyancy to weight ratio to minimize freeboard variations as the float rides in the waves regardless of sea state.

For a given instant of time, the float 13 is shown resting in the trough $c$. Due to drifting, caused by wave motion, wind and undercurrents, the buoy 12 will have a relative velocity with respect to the wave as shown by the velocity vector $V_{B/W}$, thereby causing the buoy to rise with the wave W from trough $c$ to crest $d$, fall from crest $d$ to trough $e$, etc. The total vertical excursion of the float 13 therefore substantially equals the wave height $h$. The vertical excursion of the transducer 16 streaming therefrom is maintained substantially the same as of the float 13. This is accomplished by choosing a cable 14 which manifests a very low scope $\sigma$; scope $\sigma$ being defined as the ratio of cable length $C$ to the depth $z$ measured from the undisturbed surface $s$ when the cable 14 and transducer 16 are streaming in a constant vertical water velocity profile relative thereto of 1.0 knot. It has been discovered that by limiting the scope $\sigma$ to less than 1.3, differences in vertical excursions of the float 13 and transducer 16 will be insignificant as to its effect upon a selected measurement error tolerance $\epsilon$ for the highest expected sea state.

Due to wave presence, the actual depth of sensor 16 below the surface of wave W is equal to the sum of depth $z$ and a component of the wave height $r_0$. It is well known, however, that local pressure variations in water due to waves decreases with depth. The textbook "The Oceans" by Sverdrup, Johnson and Fleming, Prentice-Hall, Inc., Englewood Cliffs, N.J., 1942, p. 528, discloses the following mathematical approximation of the radius $r$ of a circle described by a particle of water below a surface wave:

$$r = a e^{-2\pi \frac{z}{L}} \quad (1)$$

where $a$ = the amplitude of the surface wave or one-half the wave height $h$,
$z$ = the depth below the undisturbed water surface, and
$L$ = the wavelength.

Utilizing this principle, the minimum cable length C can be determined for insuring that the transducer 16 is at a depth sufficient to reduce the effects of $r_0$ to less than a maximum measurement error tolerance $\epsilon$. That is, the pressure variations sensed by transducer 16 will be due entirely to the vertical motion the buoy 12 experiences with wave motion but for an insignificant maximum selected measurement error.

By definition the desired measurement error tolerance $\epsilon$ is $$\epsilon = r/a \quad (2)$$

and the scope $\sigma$ is $$\sigma = C/z \quad (3)$$

Substituting the values of Equations 2 and 3 in Equation 1, and transposing into logarithmic form, the minimum cable length C can be expressed as $$C = -\frac{L\sigma}{2\pi} \ln \epsilon \quad (4)$$

The value of wavelength L is for the highest expected sea state to be encountered thereby insuring that the desired measurement error tolerance cannot be exceeded. The actual mesurement error, of course, will then be less for lower sea states. Values of L for various sea states are available in the published art, or they may be estimated by sight.

Conventional sonobuoys are designed for flat response from frequencies in excess of 10 Hertz, but the frequencies experienced with wave motion range from 0.05 to 1.00 Hertz. Accordingly, it is contemplated that the oceanographic buoy 12 have a flat response within the latter frequency range. The modulator 17 is designed within the present state of the art to effect response characteristics.

Having defined the buoy 12 with the above-described characteristics and limitations, it should be apparent to one skilled in the art that a wide variety of existing sonobuoy configurations which are expendable or nonexpendable and launchable from surface vessels or aircraft could be readily modified and used according to the invention. Heretofore, a freely drifting sonobuoy having such characteristics and limitations was considered unfeasible for sea wave measurements.

Referring again to FIG. 2, the RF signal from antenna 19 is received by a receiver 21 at a remote station 22 such as an aircraft, surface vessel or shore installation. The signal is then passed through a demodulator 23 to a recorder 24 where the wave motion is correlated against time thus presenting a comprehensive spectral display of wave motion over the measuring period. Such displays are particularly useful in the design, test and evaluation of sonobuoy performance when they are both correlated in time.

The above-described inventive concepts may be summarized best by way of the following illustration. Of course, it is understood that the illustration is merely exemplary and is not intended to limit the invention except to the extent that such limitations appear in the appended claims. First assume that it is desired to analyze the wave spectra in the Atlantic Ocean at latitude 25° N. longitude 75° W. and, that for the degree of integrity necessary in the measured data, a maximum measurement error of 5 percent ($\epsilon = 0.05$) will be tolerated. Next assume that for the measuring period, the maximum expected sea state is known to be Sea State 6 in which large waves begin to form and white foam crests, with some spray, are extensive everywhere. From prior art published tables, the average wavelength for Sea State 6 under the highest expected wind velocities is 300 feet ($L = 300$). An oceanographic buoy is selected having a very high buoyancy to weight ratio, flat response over a frequency range of 0.05 to 1.00 Hertz, and a scope $\sigma$ of 1.15. The minimum cable length C of conduit which must be streamed from the buoy float is now determined by substituting the foregoing values in Equation 4 as follows:

$$C = -\frac{(300)(1.15)}{2\pi} \ln 0.05$$

$$C = 164.4 \text{ feet}$$

The selected buoy is now deployed in the ocean area of interest with the transducer streaming from a cable at least 164.4 feet long, and the pressure measurements, translated in terms of depth, are continuously recorded at remote station 22. The recorded data represents a spectral display of the wave motion during the measurements.

Some of the many advantages of the invention should now be apparent. For example, a complete spectral analysis of waves in a body of water can be obtained, using a freely drifting oceanographic buoy with a predicted measurement error. The oceanographic buoy chracteristics and limitations are such that it may be easily adapted according to the invention from prior art sonobuoy technology. The invention is particularly suited for use in the design, test and evaluation of air-launched oceanographic equipment such as used in airborne acoustical surveillance systems.

It will be understood that various changes in the details, materials, steps and arrangement of parts, which have been herein described and illustrated in order to explain the nature of the invention, may be made by those skilled in the art within the principle and scope of the invention as expressed in the appended claims.

We claim:

1. Apparatus for remotely measuring wave motion comprising:

An oceanographic buoy including a float housing a radio transmitter means therein for transmitting RF signals, a pressure sensor having output signals according to embient pressure, and a flexible conduit operatively connected between said float and said senor for suspending said sensor at a desired depth below the transmitter and for transmitting said output signal to said transmitter, said conduit having a length C according to the formula $$C = -\frac{L\sigma}{2\pi} \ln \epsilon$$

where L = the maximum wavelength of the highest expected sea state, $\sigma$ = the scope of said buoy, and $\epsilon$ = the measurement error tolerance.

2. Apparatus according to claim 1 wherein the scope $\sigma$ of said buoy is less than 1.3.

3. Apparatus according to claim 2 wherein the upper limit of the frequency range of said buoy for flat response is not more than 1.0 Hertz.

4. Apparatus according to claim 2 wherein the lower limit of the frequency range of said buoy for flat response is not less than 0.05 Hertz.

5. Apparatus according to claim 4 further comprising: a remote station including a radio receiver means for receiving said RF signals and having an output signal according to said sensor output signal, and a recorder for receiving and displaying said receiver output signal on a time ordinate.

References Cited

UNITED STATES PATENTS

| | | |
|---|---|---|
| 3,098,993 | 7/1963 | Coop. |
| 3,273,111 | 9/1966 | Parenti. |
| 3,301,047 | 1/1967 | Von Wald et al. |

RICHARD C. QUEISSER, *Primary Examiner.*

JERRY W. MYRACLE, *Assistant Examiner.*